(12) United States Patent
Kim et al.

(10) Patent No.: US 9,970,392 B2
(45) Date of Patent: May 15, 2018

(54) GAS ADSORPTION MEANS FOR AUTOMOBILE

(71) Applicants: KOREA FUEL-TECH CORPORATION, Anseong-si, Gyeonggi-do (KR); WONDAE CO., LTD., Incheon (KR)

(72) Inventors: Hyun Ki Kim, Pyeongtaek-si (KR); Min Soo Lee, Incheon (KR)

(73) Assignees: KOREA FUEL-TECH CORPORATION, Anseong-si, Gyeonggi-do (KR); WONDAE CO., LTD., Incheon (KR)

( * ) Notice: Subject to any disclaimer, the term of this patent is extended or adjusted under 35 U.S.C. 154(b) by 69 days.

(21) Appl. No.: 15/103,313

(22) PCT Filed: Nov. 5, 2014

(86) PCT No.: PCT/KR2014/010563
§ 371 (c)(1),
(2) Date: Jun. 10, 2016

(87) PCT Pub. No.: WO2015/088143
PCT Pub. Date: Jun. 18, 2015

(65) Prior Publication Data
US 2016/0319777 A1    Nov. 3, 2016

(30) Foreign Application Priority Data

Dec. 10, 2013 (KR) .................. 10-2013-0153491

(51) Int. Cl.
*F02M 25/08* (2006.01)
*B01D 53/04* (2006.01)
*B60K 15/03* (2006.01)

(52) U.S. Cl.
CPC ..... *F02M 25/0854* (2013.01); *B01D 53/0407* (2013.01); *B60K 15/03* (2013.01);
(Continued)

(58) Field of Classification Search
CPC .......... B01D 53/0407; B01D 2253/102; B01D 2253/25; B01D 2253/34; B01D 2257/702;
(Continued)

(56) References Cited

U.S. PATENT DOCUMENTS 4,386,947 A * 6/1983 Mizuno .................. B01D 53/02
123/519
4,418,662 A * 12/1983 Engler ............... B01D 46/0036
123/198 D
(Continued)

FOREIGN PATENT DOCUMENTS

JP    2001-248504 A    9/2001
JP    2002-266709 A    9/2002
(Continued)

OTHER PUBLICATIONS

SAE Paper 2007-01-1090.
International Search Report in International Application No. PCT/KR2014/010563, dated Jan. 16, 2015.

*Primary Examiner* — Frank Lawrence
(74) *Attorney, Agent, or Firm* — Park, Kim & Suh, LLC

(57) ABSTRACT

The present invention relates to a gas adsorption filter for an automobile, and provides an adsorption filter formed by coupling an adsorption block including an adsorbent, which collects and separates evaporation gas introduced into a canister, and a processing body in which a vent channel is ensured.

10 Claims, 10 Drawing Sheets

(52) U.S. Cl.
CPC ....... *F02M 25/08* (2013.01); *B01D 2253/102* (2013.01); *B01D 2253/25* (2013.01); *B01D 2253/34* (2013.01); *B01D 2257/702* (2013.01); *B01D 2257/708* (2013.01); *B01D 2259/40088* (2013.01); *B01D 2259/4516* (2013.01)

(58) Field of Classification Search
CPC .... B01D 2257/708; B01D 2259/40088; B60K 15/03; F02M 25/08; F02M 25/0854
USPC ...... 95/146; 96/134, 147, 153, 154; 123/519
See application file for complete search history.

(56) References Cited

U.S. PATENT DOCUMENTS

| | | | | |
|---|---|---|---|---|
| 4,514,197 | A * | 4/1985 | Armbruster | B01D 46/10 55/385.2 |
| 4,749,392 | A * | 6/1988 | Aoki | A47C 27/005 55/513 |
| 4,756,726 | A * | 7/1988 | Peace | B01D 53/261 55/515 |
| 5,354,365 | A * | 10/1994 | Youn | B01D 46/0036 55/487 |
| 6,348,086 | B1 * | 2/2002 | Harms | B01D 46/0045 55/385.3 |
| 6,860,917 | B2 * | 3/2005 | Henrichsen | B01D 39/2086 156/62.8 |
| 7,407,533 | B2 * | 8/2008 | Steins | B01D 46/0036 210/492 |
| 7,462,224 | B2 * | 12/2008 | Wolff | B01D 53/0407 123/519 |
| 7,618,479 | B2 * | 11/2009 | Sohnemann | B01D 53/0446 95/146 |
| 7,789,075 | B2 * | 9/2010 | Makino | F02M 25/0854 123/519 |
| 2001/0035094 | A1 * | 11/2001 | Takagaki | B01D 46/0001 96/154 |
| 2005/0081717 | A1 * | 4/2005 | Meiller | B01D 53/02 96/154 |
| 2005/0145224 | A1 * | 7/2005 | Zulauf | B01D 53/02 123/518 |
| 2007/0051345 | A1 | 3/2007 | Potier | |

FOREIGN PATENT DOCUMENTS

| | | |
|---|---|---|
| JP | 2003-214264 A | 7/2003 |
| KR | 2002-0089198 A | 11/2002 |
| KR | 10-0821732 B1 | 4/2008 |
| KR | 10-2010-0104366 A | 9/2010 |
| KR | 10-1028668 B1 | 4/2011 |

* cited by examiner (a)

(b)

GAS ADSORPTION MEANS FOR AUTOMOBILE

CROSS-REFERENCE TO RELATED APPLICATIONS

This application is the National Stage filing under 35 U.S.C. 371 of International Application No. PCT/KR2014/010563, filed on Nov. 5, 2014, which claims the benefit of Korean Patent Application No. 10-2013-0153491, filed on Dec. 10, 2013, the contents of which are all hereby incorporated by reference herein in their entirety.

TECHNICAL FIELD

The present invention relates to a gas adsorption means for an automobile and, more particularly, to a gas adsorption means for an automobile that is formed by combining an adsorption block including an adsorbent collecting and separating evaporation gas flowing into a canister, with a processing body having a vent channel, that reduces load on a device by increasing permeability for evaporation gas and decreasing back pressure, that maximizes adsorption/separation efficiency of evaporation gas and reduces evaporation gas discharge to the atmosphere by allowing an adsorption block close to the vent channel to immediately collect and separate evaporation gas passing through the vent channel, that becomes more useful by making the adsorption block adsorb/separate evaporation gas by maximally reducing a local difference between adsorption and separation efficiency because vent channels are ensured throughout a porous bulk.

BACKGROUND ART

In general, vehicles are equipped with a fuel system including a fuel tank, and evaporation gas of gasoline is produced in the fuel tank when gasoline fuel is used. The gasoline evaporation gas mainly includes hydrocarbon (HC), so when it is discharged without any treatment, it causes severe air pollution.

In order to prevent this problem, vehicles using gasoline fuel are equipped with a canister for collecting fuel evaporation gas. The canister has an adsorbent therein, so it adsorbs and keeps evaporation gas produced in a fuel tank and then sends it to a carburetor with external gas for combustion, thereby preventing evaporation gas from leaking outside.

However, to collect evaporation gas, a canister of the related art, as shown in FIG. 1, uses active carbon in a particulate powder type and has narrow and complicated vent channels, so gas cannot smoothly flow. Accordingly, large back pressure is generated and it increases the load applied to the entire device, so the adsorption/separation efficiency of evaporation gas is low.

In particular, legislation for enhancing regulation of evaporation gas from vehicles has recently been adopted in many countries. However, existing canisters cannot sufficiently control evaporation gas from vehicles and thus do not comply with new rules. Accordingly there is an urgent need to solve this problem.

One of the reasons that vehicles produce exhaust gas is that hydrocarbon remaining in active carbon porosities in a canister is exposed diurnal changes of temperature while a vehicle is parked for several days. Such a process is called "DBL (Diurnal Breathing Loss)".

At present, the KOREAN Environment Agency regulates automotive DBL to under 1.2 g/day for vehicles sold from 2014 through revision of Clean Air Conservation Act, and a rule for regulating DBL to under 0.3 g/day from 2017 is currently under examination. Further, CARB (California Air Resources Board) in the U.S. has a plan to phase in rules for regulating not only automotive DBL to 0.3 g/day, but also to phase in regulation for DBL for a canister to under 20 mg/day from 2014 to 2022.

There are two methods for satisfying the DBL regulations. The first method is to decrease the cross-sectional area of the canister and increase the length of active carbon in a canister keeping evaporation gas or air, or to add an auxiliary canister having the structure described above to the air side of a canister. According to this method, it is possible to reduce hydrocarbon remaining in the active carbon by increasing the amount of air passing through the active carbon and reducing the speed of evaporation gas produced in a fuel tank and diffused to the atmosphere through an adsorbent in a canister in accordance with a diurnal change of temperature, so it is possible to reduce DBL. However, according to the canister structure described above, there is a limit in decreasing the cross-sectional area and increasing the length while satisfying conditions for evaporation gas or air flow required by an actual fuel system (see Korean Patent Application No. 2002-0089198, Korean Patent No. 0821732, and SAE Paper 2007-01-1090).

The second method, proposed in US 2007/0051345 A1 and Korean Patent Application No. 2010-0099075, is to provide a heater in a canister or at the atmosphere side to increase separation efficiency of evaporation gas remaining in active carbon. Since a heater is provided, evaporation gas remaining in active carbon is minimized and the separation efficiency of evaporation gas is increased by heating air flowing inside when a canister is attached/detached. However, according to this method, there is a need for an electric device or a complicated system for the heater and a safety problem may be caused by the heater.

DISCLOSURE

Technical Problem

The present invention has been proposed to solve the problems in the related art. According to an aspect of the present invention, there is provided a gas adsorption means for an automobile for collecting evaporation gas produced in a fuel tank of a vehicle, which includes a base material that is a porous body being advantageous in venting, which has an adsorption block having an adsorbent and formed at a portion of the porous body, which can be easily shaped to ensure vent channels because its shape is variable, which can minimizes evaporation gas remaining on the adsorbent and improve adsorption/separation efficiency of evaporation gas, for example, by decreasing the cross-sectional area and increasing the length of the vent channels, and which can improve competitiveness of a product.

According to another aspect of the present invention, there is provided a gas adsorption means for an automobile that can minimize DBL because it can reduce the speed of evaporation gas produced in a fuel tank and diffused to the atmosphere though the adsorption means in accordance with a diurnal change of temperature, as the result of improving the ability of passing gas by using a porous body as the adsorption means.

According to a further aspect of the present invention, there is provided a gas adsorption means for an automobile that reduces a difference in local adsorption/separation amount of evaporation gas with high venting ability by using a porous body having vent channels throughout the bulk, that can induce an adsorption block to contribute to adsorbing/separating evaporation gas, and that can maximize usability and adsorption efficiency.

According to still another aspect of the present invention, there is provided a gas adsorption means for an automobile that reduces back pressure due to evaporation gas because it has sufficient vent channels and that can reduce load on a canister and other peripheral devices.

Technical Solution

In order to achieve the above object, according to one aspect of the present invention, there is provided a gas adsorption means for an automobile for collecting evaporation gas produced in a fuel tank of a vehicle. The gas adsorption means includes: porous sheet having vent channels for evaporation gas or air; and adsorption blocks continuously arranged in one or several directions in the porous body to collect the evaporation gas.

The porous body may be a mesh type porous sheet or a foam block.

When the porous body is a mesh type sheet, the adsorption blocks may be continuously arranged in parallel with each other with predetermined gaps on a side of the porous body and fixed to the porous body by any one of heat, ultrasonic waves, or an adhesive.

The adsorption means may be received in a coil shape, or stacked or arranged in multiple layers in a space.

When the porous body is a foam block, the adsorption blocks may be received in holes continuously formed in several directions with predetermined gas in the porous body and the holes may be continuously formed up and down and left and right.

The adsorption blocks each may include: an adsorbent collecting evaporation gas; and an enclosing body keeping the adsorbent and having a pocket shape with porosities.

The enclosing bodies may be continuously arranged and fixed to a side of the porous body by any one of heat, ultrasonic waves, and an adhesive.

The enclosing bodies may be received in the holes of the porous body.

The adsorbent may be particulate active carbon and the enclosing body may be any one of porous non-woven fabric or woven fabric at a millimeter or micrometer level corresponding to the active carbon to prevent separation of the active carbon.

The porous sheet may control adsorption/separation efficiency by controlling a ratio A/l of a cross-sectional area A through which evaporation gas passes and a length l of a vent channel through which the evaporation gas passes within a predetermined volume.

Advantageous Effects

According to the present invention, there is provided a gas adsorption means for an automobile for collecting evaporation gas produced in a fuel tank of a vehicle, which includes a base material that is a porous body being advantageous in venting, which has an adsorption block having an adsorbent and formed at a portion of the porous body, which can be easily shaped to ensure vent channels because its shape is variable, which can minimizes evaporation gas remaining on the adsorbent and improve adsorption/separation efficiency of evaporation gas, for example, by decreasing the cross-sectional area and increasing the length of the vent channels, and which can improve competitiveness of a product.

Further, it is possible to minimize DBL because it can reduce the speed of evaporation gas produced in a fuel tank and diffused to the atmosphere though the adsorption means in accordance with a diurnal change of temperature, as the result of improving the ability of passing gas by using a porous body as the adsorption means.

Further, it is possible to reduce a difference in local adsorption/separation amount of evaporation gas with high venting ability by using a porous body having vent channels throughout the bulk, induce an adsorption block to contribute to adsorbing/separating evaporation gas, and maximize usability and adsorption efficiency.

Further, since vent channels are ensured in the adsorption means, back pressure due to evaporation gas can be reduced and load on a canister and other peripheral devices can be decreased.

BEST MODE

Embodiments of the present invention will be described hereafter in detail with reference to the accompanying drawings. In describing the present invention, well-known functions or constructions will not be described in detail since they may unnecessarily obscure the understanding of the present invention.

Terminologies defined to describe the present invention are determined in consideration of functions in the present invention and may be changed according to intention of those skilled in the art or customs in the art, so the terminologies should be construed on the basis of the entire specification.

The gas adsorption means according to the present invention is characterized in that the shape of a porous body including an adsorbent can be easily varied, other than the effective characteristics. In particular, the porous body is shaped such that the vent channels are long and the cross-sectional area of the porous body is small such that the flow rate and direction of evaporation gas concentrates on the vent channels, and the vent channel can ensure flow of the evaporation gas. Accordingly, it is characterized in that adsorption/separation efficiency can be maximized without a loss of evaporation gas adsorbed/separated. Accordingly, the shape of the internal space of a canister is improved to increase the adsorption/separation efficiency, so it is possible to easily achieve various shapes of an adsorption means to correspond to this shape, and accordingly, usability of the adsorption means can be improved.

For example, the adsorption means can control adsorption/separation efficiency by controlling the ratio A/l of the cross-sectional area A of a porous body through which evaporation gas passes and the length l of a vent channel in the porous body within a predetermined volume, and particularly, it can improve the adsorption/separation efficiency by decreasing A and increasing l.

Figure 11:
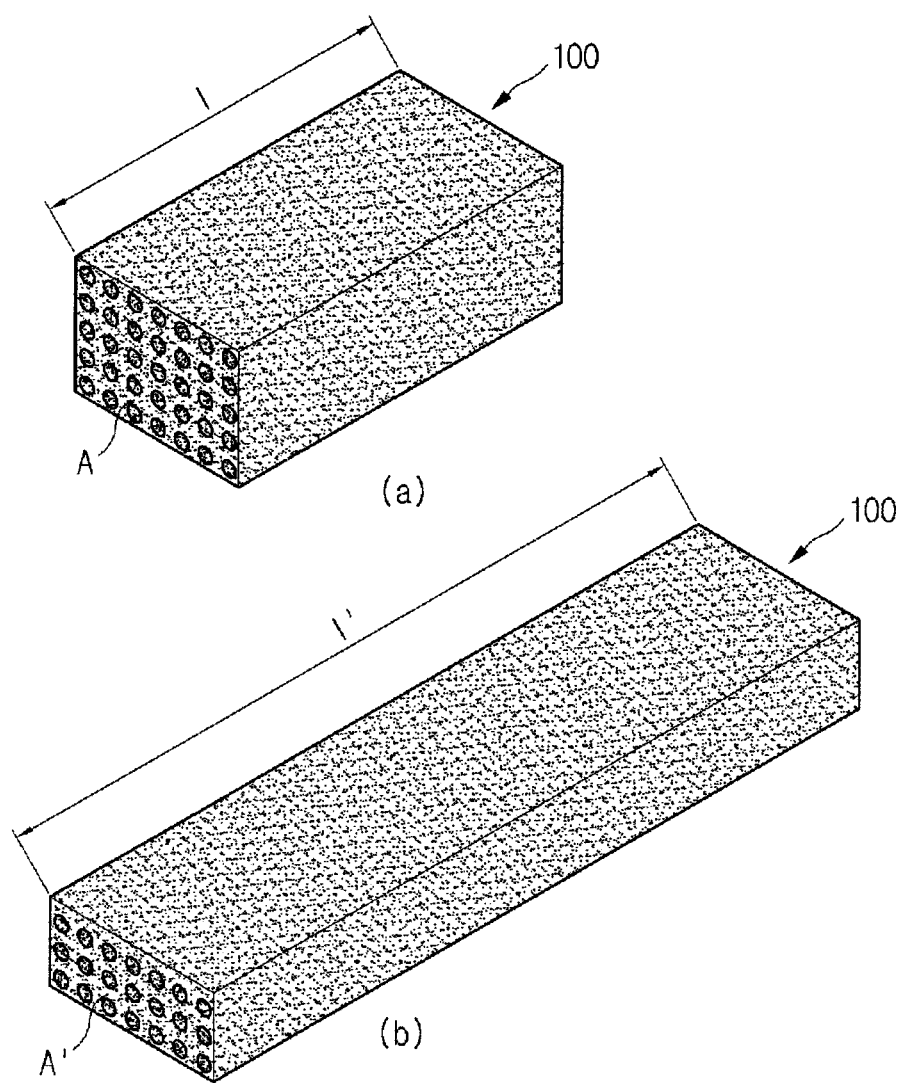
FIG. 11 shows an adsorption means according to an embodiment of the present invention in schematic views, in which the cross-sectional areas A and A' and the lengths l and l' of evaporation gas channels are different.

As shown in FIG. 11, assuming that the cross-sectional area and the length of the vent channels are changed from FIG. 11a to FIG. 11b, that is, to satisfy A>A' and l<l', if evaporation gas passes through a relatively long vent channel while the evaporation gas passes through vent channels, more evaporation gas can be adsorbed. Accordingly, improvement of adsorption efficiency can be improved.

Figure 3:
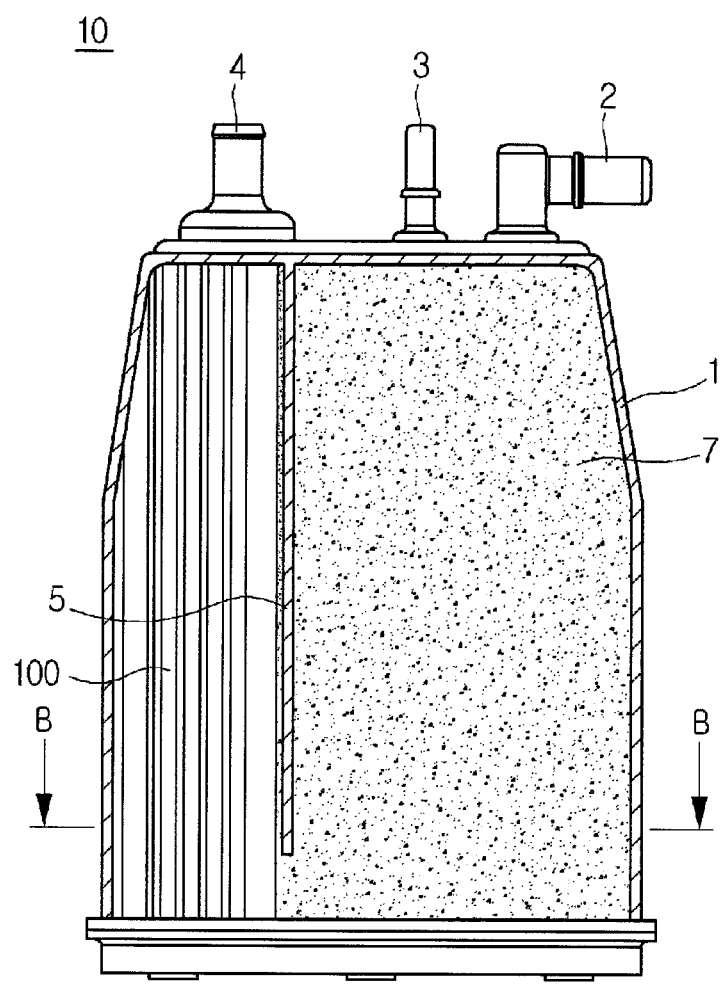
Figure 3:
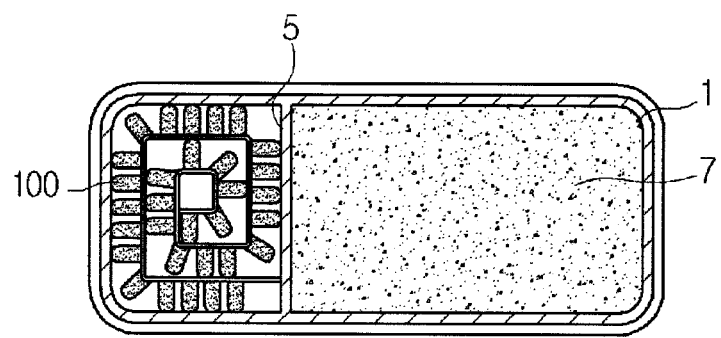
Figure 4:
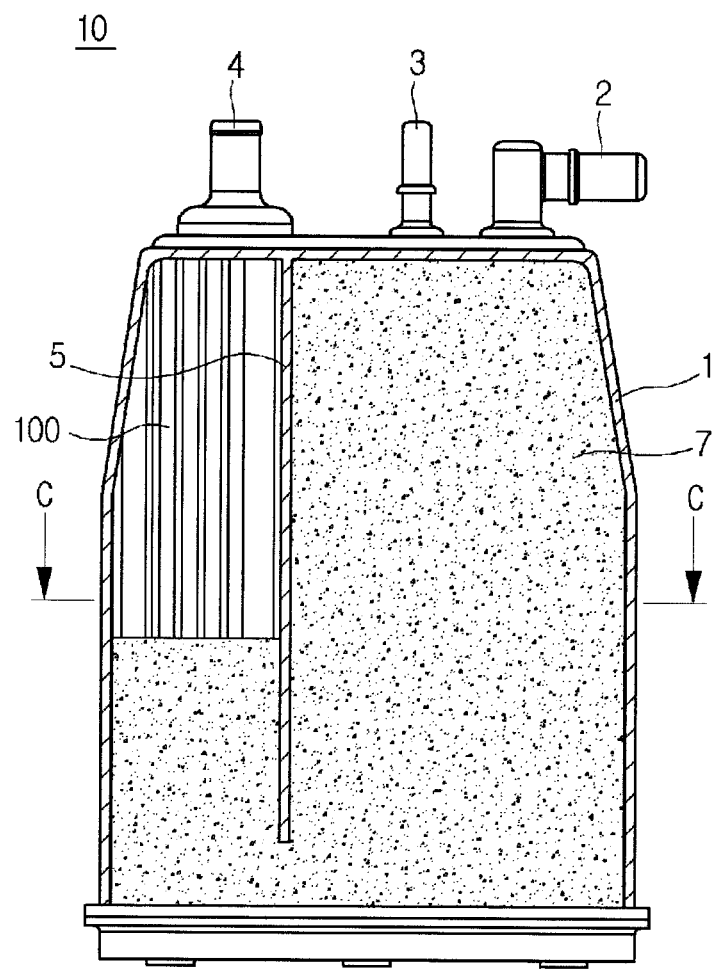
Figure 4:
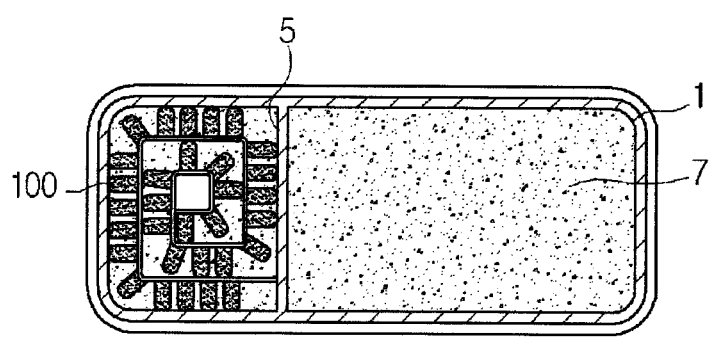
Figure 5:
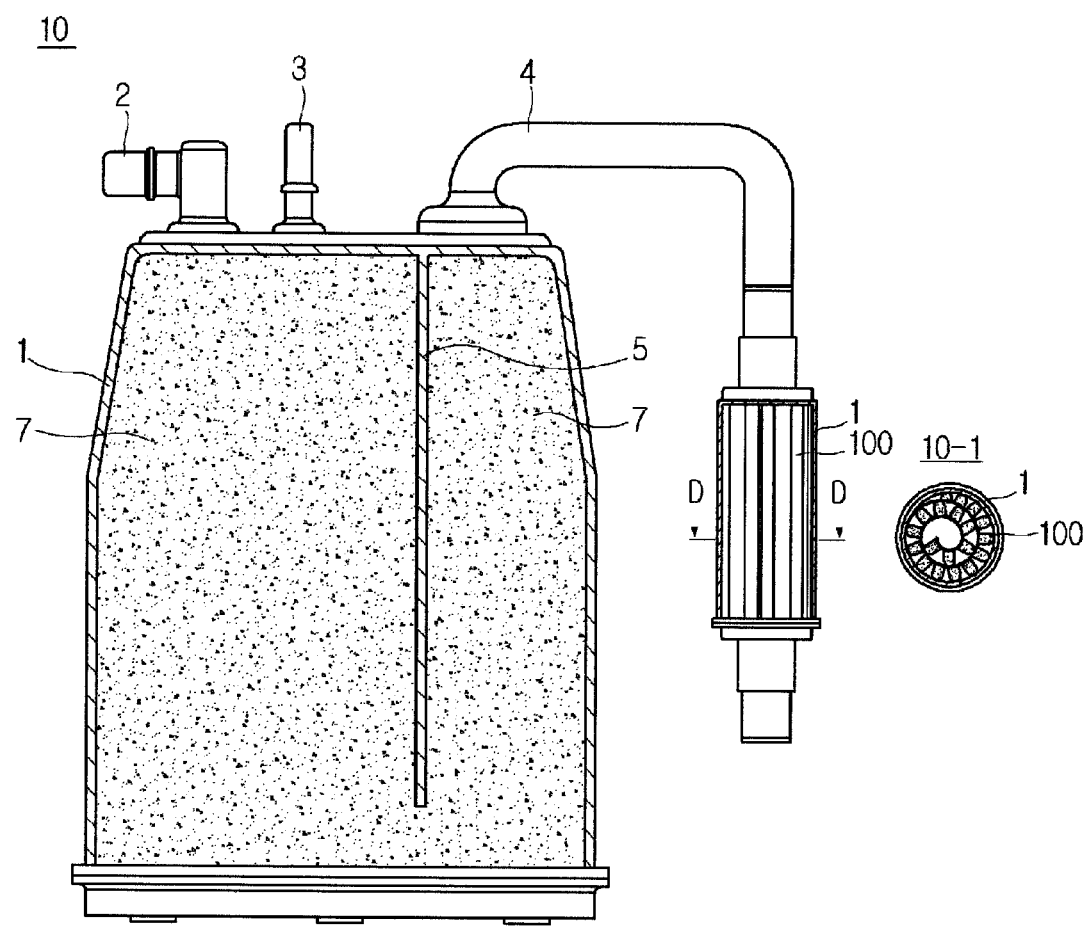
FIG. 5 is a view showing the gas adsorption means according to an embodiment of the present invention in an auxiliary canister.
Figure 6:
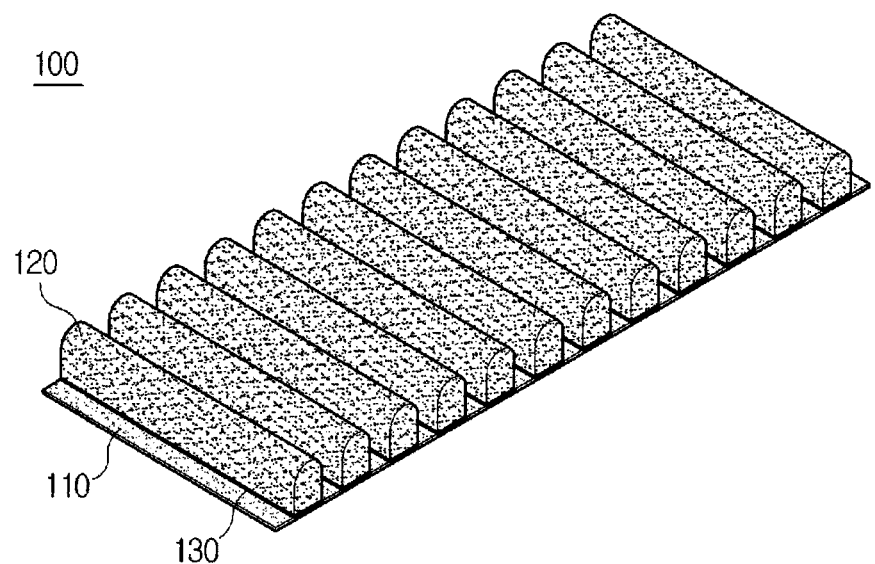
FIG. 6 is a perspective view showing a gas adsorption means according to an embodiment of the present invention.

FIGS. 2 to 5 are views showing the gas adsorption means according to an embodiment of the present invention in a canister. FIGS. 2 to 5 show a canister and FIG. 6 shows an auxiliary canister combined with a canister. Further, the figures each include a front cross-sectional view and a plan cross-sectional view, that is, FIGS. 2 to 4 each provide a front cross-sectional view at the upper portion and a plan cross-sectional view at the lower portion and FIG. 5 provides a front cross-sectional view of a canister and an auxiliary canister at the left side and a plan cross-sectional view of an auxiliary canister at the right side.

An adsorption block of an adsorption means according to an embodiment of the present invention is longitudinally shown in the front cross-sectional views and a cross-section vertically taken along the longitudinal direction of the adsorption block of the adsorption means according to an embodiment of the present invention is shown in the plan cross-sectional view.

Figure 1:
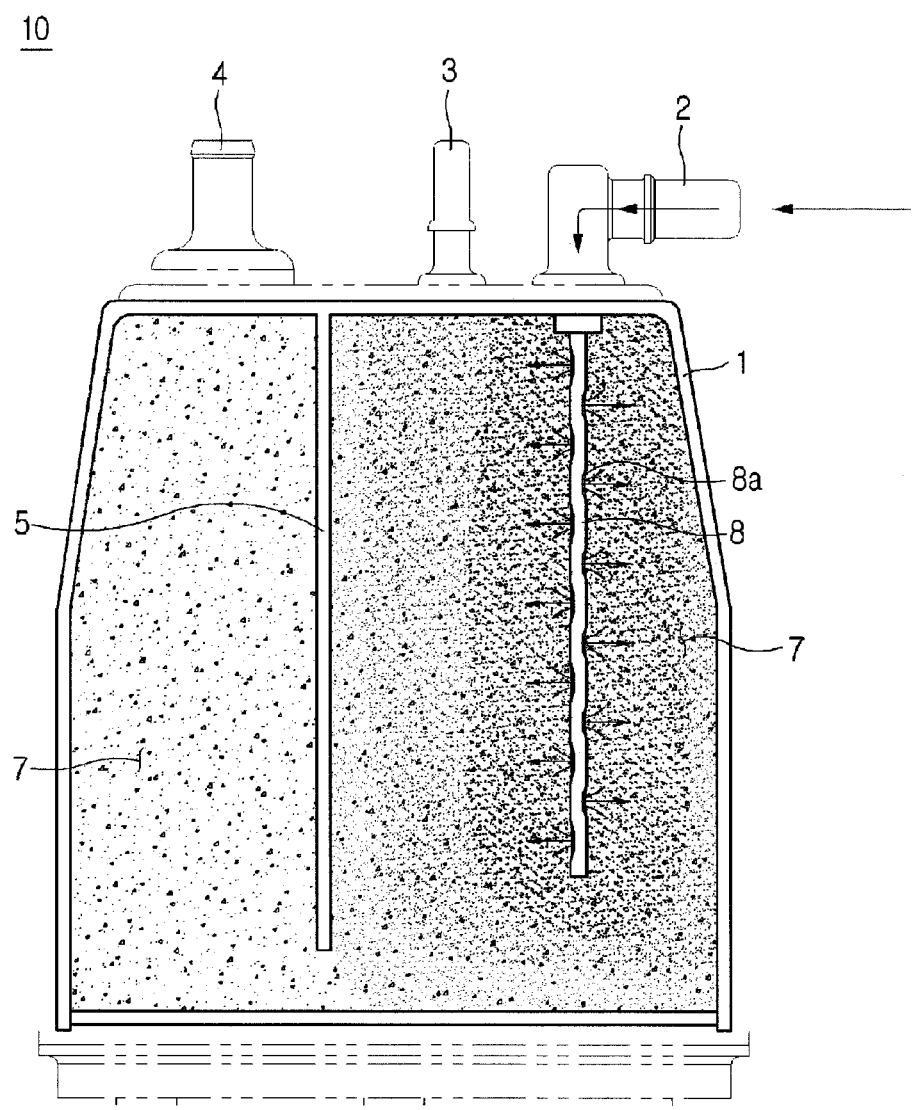
FIG. 1 is a view showing the entire gas adsorption means for an automobile of the related art.
Figure 2:
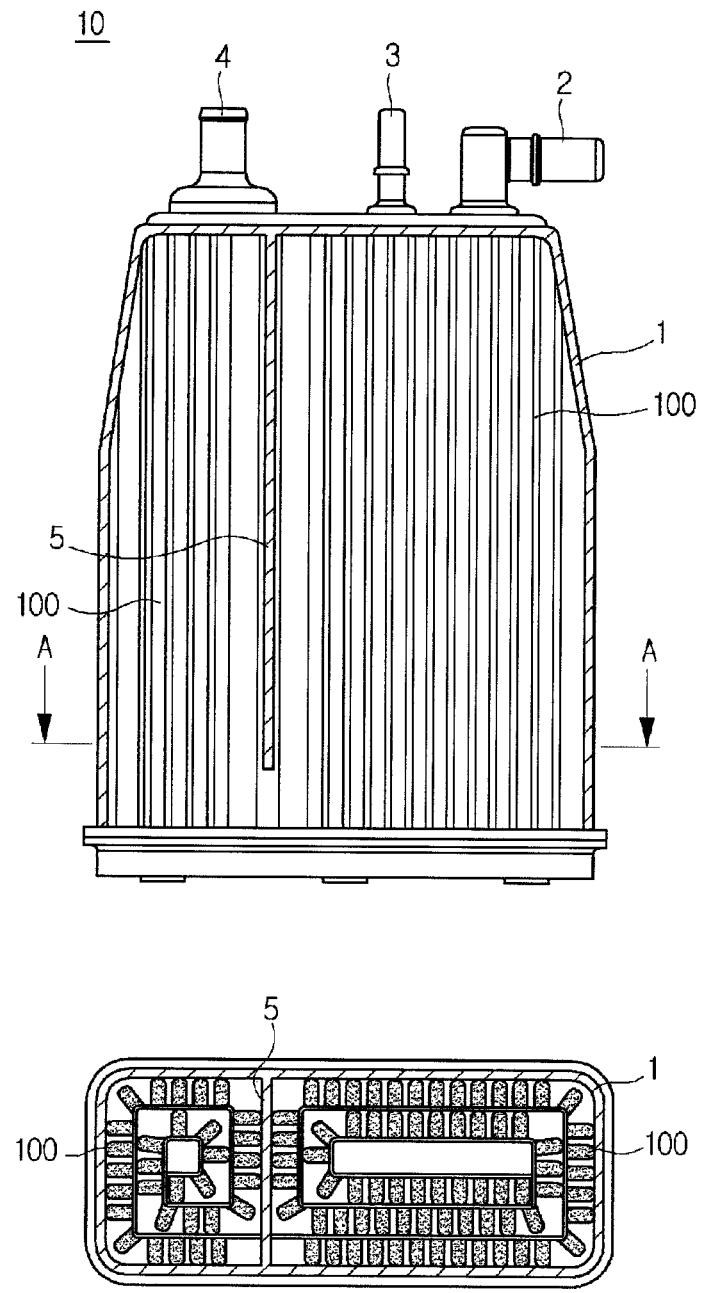
FIGS. 2 to 4 are view showing the gas adsorption means according to an embodiment of the present invention in a canister.

As in FIG. 2, an adsorption means 100 according to an embodiment of the present invention can be received in the entire inside 140 of a housing 1 of a canister 10, or as in FIGS. 3 and 4, it may be received in a portion of the inside 140 and the other space may be filled with active carbon, as in the related art.

The adsorption means according to the present invention can be applied not only to the canister 10, but to an auxiliary canister for compensating for and increasing the function of the canister 100, which is shown in FIG. 6.

The function of a canister will be described to be commonly applied to the configuration shown in FIGS. 2 to 5.

As shown in FIGS. 2 to 5, the adsorption means 100 is received in the internal space 140 of the housing 1 of the canister 10 to collect evaporation gas flowing inside through a fuel tank port 2. Preferably, the traveling direction of the evaporation gas is the same as the extension direction of the adsorption block of the adsorption means 100, so appropriate vent channels for the evaporation gas and air are formed. However, if necessary, the traveling direction of the evaporation gas may not be the same as the extension direction of the adsorption block of the adsorption means 100, which may be determined in consideration of the sped and the kind of the evaporation gas and air. As compared with a canister filled with only active carbon, the porous body 110 has more vent channels, so gas flow can be improved and back pressure by evaporation gas can be reduced. Further, the adsorption means shown in FIG. 2 may further have spaces between the porous bodies 110 in accordance with modifications of the shape, so vent channels can be more surely formed, so it is very advantageous in gas flow.

Further, as shown in the figures, a plurality of adsorption blocks 120 may be formed in parallel in one direction in the porous body 110, and though not shown, they may be formed in different directions. That is, the direction of the adsorption blocks 120 is not limited to any one direction.

The adsorption means 100 is made of an air-permeable material to allow gas to smoothly flow, so evaporation gas is adsorbed throughout the area and it is possible to prevent evaporation gas from remaining in purging.

That is, it is possible to increase the ability of collecting evaporation gas by maximizing spatial usability, that is, minimizing a dead zone by increasing air permeability of the adsorption means 100, and it is possible to prevent leakage of evaporation gas by completely burning the adsorbed evaporation gas in purging.

Further, in the adsorption means 100, as shown in the cross-section 10-1 taken in direction DD in FIG. 5, it is preferable that the flow direction of evaporation gas and the longitudinal direction of the adsorption block 120 are in parallel, but the adsorption means 100 may be fixed in the inside 140 such that the flow direction of evaporation gas and the longitudinal direction of the adsorption block 120 are perpendicular to each other, if necessary. Accordingly, the configuration that the flow direction of evaporation gas and the longitudinal direction of the adsorption block 120 are in parallel with each other should be construed as an example in use of the adsorption means 100 of the present invention.

The adsorption means 100, as shown in FIG. 6, includes a porous body 110 made of an air-permeable material and adsorption blocks 120 collecting evaporation gas, which will be described in detail with reference to FIGS. 6 to 8.

Figure 7:
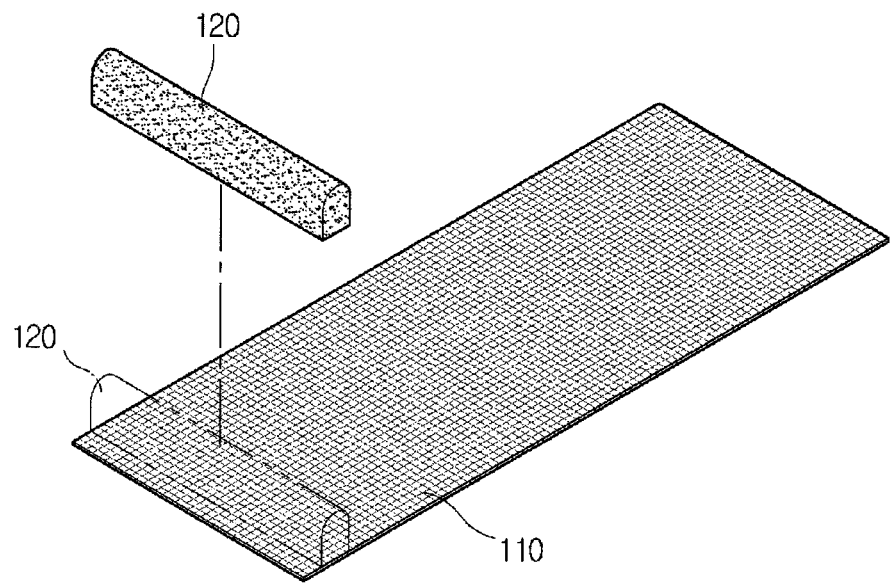
FIG. 7 is a perspective view showing a porous body according to an embodiment of the present invention.
Figure 8:
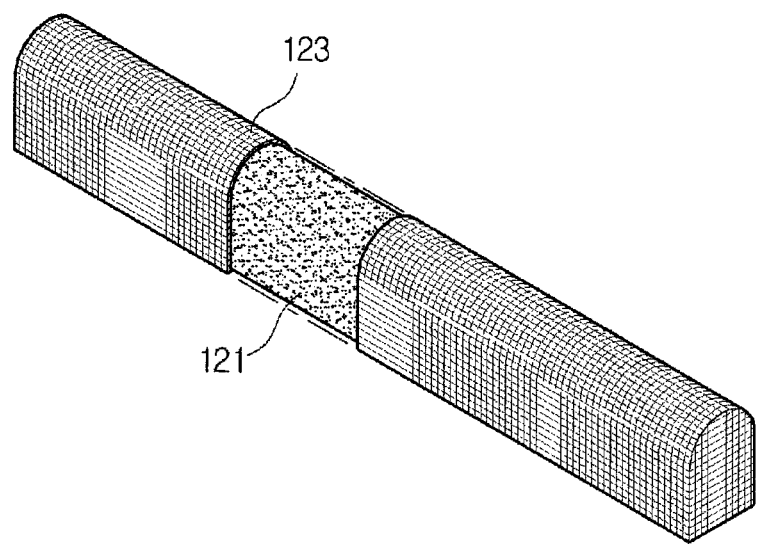
FIG. 8 is a perspective view showing an adsorption block body according to an embodiment of the present invention.

FIG. 6 is a perspective view showing an adsorption means according to an embodiment of the present invention, FIG. 7 is a perspective view of a porous body, and FIG. 8 is a perspective view of an adsorption block.

The porous body 110 is a bulk and mesh type of porous sheet, in which the sheet is preferably woven or non-woven fabric, but is not limited thereto, and various sheets made of various materials (for example, metallic mesh) may be used.

The adsorption blocks 120 are continuously arranged with predetermined intervals with the porous body 110 and bonded to a side of the porous body 110 by any one of heat, ultrasonic waves, and an adhesive, in which the bonding areas are bonding portions 130.

The adsorption block 120 includes a pocket-shaped enclosing body 123 having porosities and receiving an adsorbent 121 for keeping evaporation gas.

The adsorbent 121 may be particulate active carbon and the enclosing body 123 is a pocket for keeping the adsorbent 121, that is, the active carbon, and the enclosing bodies 123 are continuously arranged and fixed by any one of heat, ultrasonic waves, and an adhesive on a side of the porous body.

The enclosing body 123 may be made of an air-permeable material and may be a pocket having porosities at a millimeter or micrometer level corresponding to the adsorbent to prevent separation of the adsorbent 121, and the reason is for preventing separation of the adsorbent 121 and for ensuring smooth venting of gas.

That is, the reason is for improving the ability of keeping evaporation gas and preventing evaporation gas from remaining in purging so that evaporation gas can be smoothly attached and detached.

Figure 9:
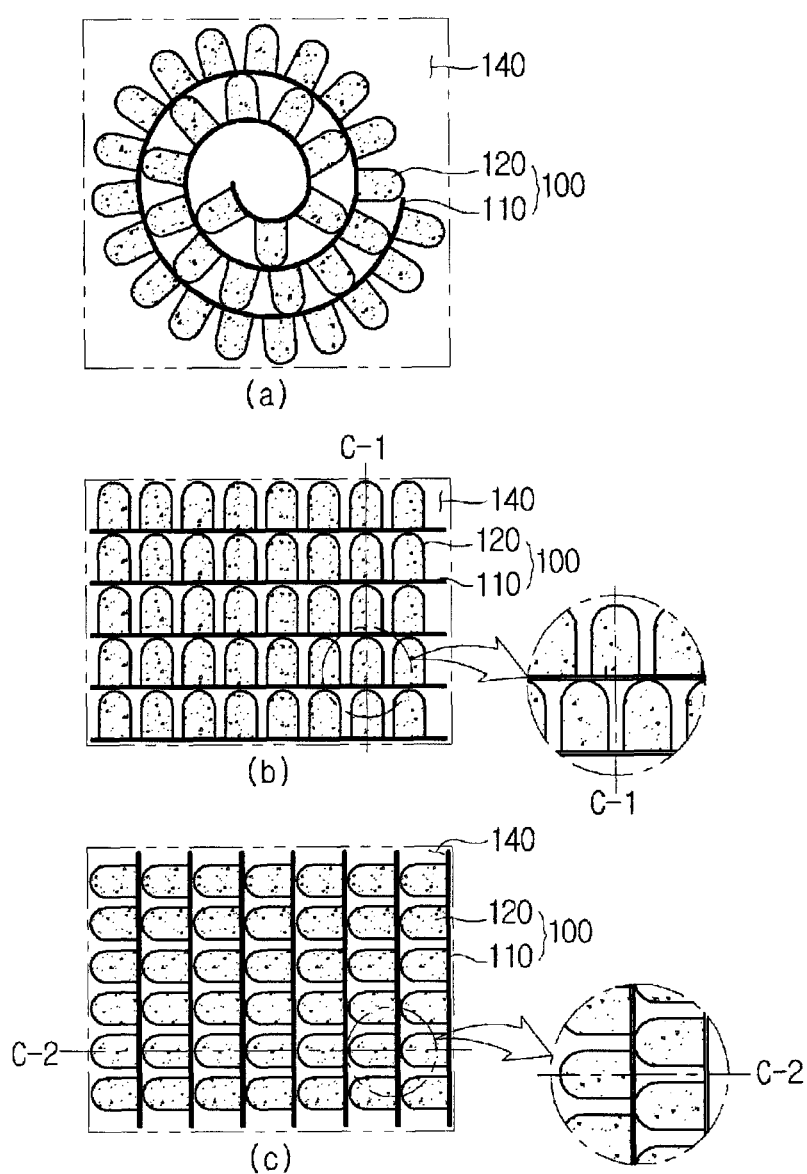
FIG. 9 shows a reception state of an adsorption block body according to an embodiment of the present invention in perspective views.

The adsorption means 100 of FIG. 9 may be received in the space 140 in a coil shape, as in FIG. 9a, horizontally stacked in multiple layers, as in FIG. 9b, or vertically continuously arranged, as in FIG. 9c.

The adsorption block 120 may be received in various shapes in accordance with the shape of the space 140. In particular, when the adsorption blocks 120 are received in a coil shape as shown in FIG. 9a, it is not limited to a circular shape, but may be wound to correspond to the shape of the space 140 and it is preferable that one or more adsorption blocks are received in accordance with the size of the space.

Further, adsorption blocks 120 positioned up and down and ahead and behind in FIGS. 9b and 9c may be arranged in the same lines C-1 and C-2, or adsorption blocks 120 positioned up and down and ahead and behind may be alternately arranged, as in the detailed views.

The adsorption means 100 is not limited to the shapes shown in FIGS. 2 to 9 and may be formed in a block shape, as in FIG. 10, and this configuration is described with reference to FIG. 10.

Figure 10:
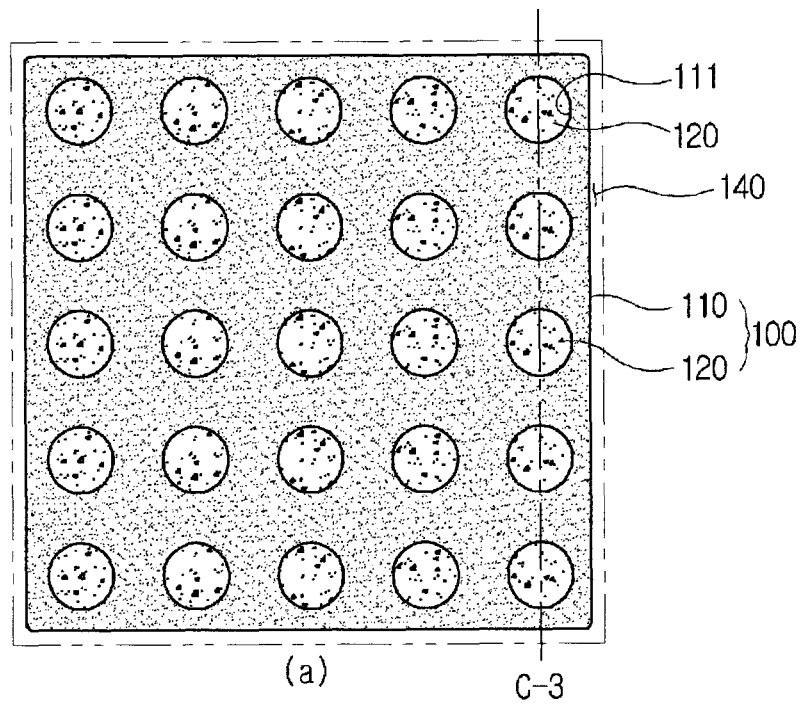
FIG. 10 shows an example of an adsorption means according to an embodiment of the present invention in perspective views.
Figure 10:
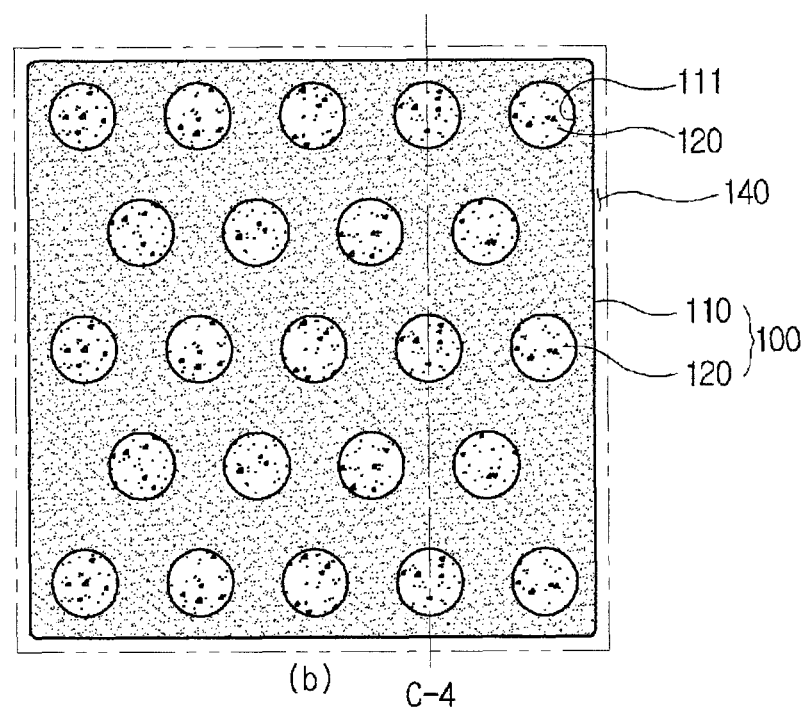

FIG. 10 shows an example of an adsorption means according to an embodiment of the present invention in perspective views.

As shown in the figures, the adsorption means 100 is a foam block having a size corresponding to the space 140 and includes a porous body 110 having holes 111 arranged in several directions with predetermined gaps and adsorption blocks 120 received in the porous body 110. The porous body 110 is a foam block, for example, a porous sponge.

The holes 111 are formed with predetermined gaps, as shown in FIGS. 10a and 10b, and they may be formed with up and down predetermined gaps along reference lines including a reference line C-3, or they may be alternately arranged up and down along reference lines including a reference line C-4 to achieve smooth flow of gas.

The holes 111 have a shape corresponding to the shape of the adsorption blocks 120 and are not limited to the shape shown in the figures. Further, as shown in the figures, they may be formed not only in a circle, but a triangle, a rectangle, a polygon, and an ellipse, though not shown in the figures.

The adsorption blocks 120, as shown in FIG. 10, may be composed of an adsorbent 121 and an enclosing body 123 for keeping the adsorbent 121 to be separated out of the porous body 110 through the holes 111, or, although not shown in the figures, the adsorption blocks 120 may be composed of only the adsorbent 121 and inserted in the holes 111, in which the holes may be closed by a specific closing member (for example, a porous material such as woven or non-woven fabric) to prevent the adsorbent 121 from separating from the holes 111.

As described above, by increasing air-permeability of an adsorption means 100 for collecting evaporation gas flowing into a canister 10 and ensuring vent channels in the adsorption means 100, spatial usability can be increased by minimizing a dead zone and the ability of collecting evaporation gas can be improved. Further, when the collected evaporation gas is purged, the evaporation gas may be completely burned, which is a characteristic of the present invention.

The adsorption blocks 120 according to the present invention are distributed close to vent channels, so most evaporation gas flowing through the vent channels can be collected, and accordingly, adsorption/separation of evaporation gas can be considerably improved, which is also a characteristic of the present invention.

The present invention was described in detail with reference to examples, but the present invention is not limited thereto and may be modified in various ways without departing from the scope of the present invention. Accordingly, the embodiments described above are provided not to limit the scope of the present invention, but to describe the present invention, so the scope of the present invention should not be construed as being limited by the embodiments. The protective range of the present disclosure should be construed on the basis of claims and all the technical spirits in the equivalent range should be construed as being included in the scope of the right of the present disclosure.

The invention claimed is:

1. A gas adsorption means for an automobile for collecting evaporation gas produced in a fuel tank of a vehicle, the gas adsorption means comprising:
   a porous body having a vent channel for evaporation gas or air; and
   adsorption blocks continuously arranged in one direction on the porous body to collect the evaporation gas,
   wherein the adsorption blocks each include:
      an adsorbent collecting evaporation gas; and
      an enclosing body keeping the adsorbent and having a pocket shape with porosities,
   wherein the porous body is configured to vary a shape thereof to change a ratio A/l, where A is a cross-sectional area of the porous body and l is a length of the porous body, and
   wherein the cross-sectional area A is decreased and the length l is increased while a volume of the porous body is maintained equal to or less than a predetermined volume, such that the vent channel in the porous body through which the evaporation gas passes is elongated to absorb more evaporation gas.

2. The gas adsorption means of claim 1, wherein the adsorption blocks are fixed to the porous body by any one of heat, ultrasonic waves, or an adhesive.

3. The gas adsorption means of claim 2, wherein the adsorption means is received in a coil shape, or stacked or arranged in multiple layers in a space.

4. The gas adsorption means of claim 1, wherein the enclosing bodies are continuously arranged and fixed to a side of the porous body by any one of heat, ultrasonic waves, and an adhesive.

5. The gas adsorption means of claim 4, wherein the adsorbent is particulate active carbon and the enclosing body is any one of porous non-woven fabric or woven fabric to prevent separation of the active carbon.

6. A method for absorbing evaporation gas produced in a fuel tank of a vehicle, the method comprising:
   providing a gas adsorption means in a canister connected to the fuel tank, the gas adsorption means including a porous body having a vent channel for evaporation gas or air and adsorption blocks continuously arranged in one direction on the porous body, wherein the adsorption blocks each include an adsorbent collecting evaporation gas and an enclosing body keeping the adsorbent and having a pocket shape with porosities;
   collecting, via the gas adsorption means, the evaporation gas flowing into the canister; and
   changing a ratio A/l by varying a shape of the porous body to improve absorption efficiency, where A is a cross-sectional area of the porous body and l is a length of the porous body, the changing the ratio Nl including decreasing the cross-sectional area A and increasing the length l while a volume of the porous body is maintained equal to or less than a predetermined volume, such that the vent channel in the porous body through which the evaporation gas passes is elongated to absorb more evaporation gas.

7. The method of claim 6, wherein the adsorption blocks are fixed to the porous body by any one of heat, ultrasonic waves, or an adhesive.

8. The method of claim 6, wherein the adsorption means is received in a coil shape, or stacked or arranged in multiple layers in a space.

9. The method of claim 6, wherein the enclosing bodies are continuously arranged and fixed to a side of the porous body by any one of heat, ultrasonic waves, and an adhesive.

10. The method of claim 6, wherein the adsorbent is particulate active carbon and the enclosing body is any one of porous non-woven fabric or woven fabric to prevent separation of the active carbon.

\* \* \* \* \*